United States Patent [19]

Ossman et al.

[11] Patent Number: 5,343,326
[45] Date of Patent: Aug. 30, 1994

[54] COMPACT ROS IMAGING SYSTEM

[75] Inventors: Kenneth R. Ossman, Macedon; Susan E. Dunn, Rochester, both of N.Y.

[73] Assignee: Xerox Corporation, Stamford, Conn.

[21] Appl. No.: 100,809

[22] Filed: Aug. 2, 1993

[51] Int. Cl.$^5$ ............................................. G02B 26/08
[52] U.S. Cl. .................................... 359/216; 359/217; 359/218; 359/859; 250/236
[58] Field of Search ................ 359/212, 216–219, 359/728–730, 859; 250/234–236; 358/474, 494; 346/108, 160

[56] References Cited

U.S. PATENT DOCUMENTS

| | | | |
|---|---|---|---|
| 3,706,484 | 12/1972 | Doi et al. | 359/219 |
| 3,750,189 | 7/1973 | Fleischer | 346/74 |
| 4,704,521 | 11/1987 | Loy | 359/217 |
| 4,912,321 | 3/1990 | Cooper | 359/217 |
| 4,941,721 | 7/1990 | Banton et al. | 359/217 |
| 5,142,403 | 8/1992 | Ossman | 359/216 |

*Primary Examiner*—Loha Ben
*Assistant Examiner*—James Phan

[57] ABSTRACT

The pre-polygon scanning path length of a raster output scanning system is reduced by replacing a required cylinder lens, or lenses, with two cylindrical mirrors. One mirror with a negative, concave surface and a second positive cylindrical mirror. The first mirror directs the light beam to the second mirror. The second mirror directs the light onto the facets of a rotating polygon to form a focused beam in the vertical axis of the polygon. The function of the two cylindrical mirrors is to act as a telephoto lens to properly focus the image of the laser at the polygon facet while reducing the total pre-polygon path length.

5 Claims, 2 Drawing Sheets

COMPACT ROS IMAGING SYSTEM

BACKGROUND OF THE INVENTION AND MATERIAL DISCLOSURE STATEMENT

The present invention relates to a Raster Output Scanner (ROS) and, more particularly, to a ROS having a compact optical system design.

Printing systems utilizing lasers to reproduce information are well known in the art. Typically, such systems include a laser for generating a laser beam, a modulator, such as an acousto-optic modulator or laser diode driver electronics, for modulating the laser beam in accordance with input information to be reproduced, a multifaceted polygon scanner for scanning the modulated laser beam across a medium on a line to line basis, and various optical components to focus and align the laser beam at the medium.

In some printing systems it is required that a cylindrical lens be interposed between the modulated laser beam and the polygon scanner to shape the laser beam to optically correct for motor-polygon induced sagittal beam position errors, commonly referred to as wobble errors. The optical system disclosed in U.S. Pat. No. 3,750,189 illustrates the general utility of such a lens. The cylindrical lens is preferably aligned with the laser beam to redistribute the energy of the modulated laser beam in a manner whereby the energy distribution of the laser beam incident on the recording medium is substantially symmetrical about the start of scan and end of scan positions of the medium, and focused to a small spot. This is particularly important in those systems which utilize a xerographic recording medium.

A compact design for the scanning optics of these prior art type of ROS printers is desirable to make the machine itself as compact as possible and to enable extendability of the same ROS design into many machine architectures.

One well known technique is to introduce folding mirrors to fold the optical path and allow the optical components to be positioned in a more compact area. Another concept disclosed in U.S. Pat. No. 5,142,403, is to replace both a folding mirror and a cylindrical lens in the pre-polygon optics with a single cylindrical mirror. This technique has been found useful for ROS systems which utilize either an underfilled facet design; e.g. the light beam directed against the rotating polygon illuminates only a portion of each facet or in an overfilled facet design; e.g. the light beam directed against the rotating polygon completely illuminates each facet and a portion of adjacent facets. Each design, overfilled and underfilled, has advantages and disadvantages. One of the disadvantages of the overfilled design is that a longer pre-polygon optical path is required to properly image the larger spot at the overfilled facets. A cylindrical lens is required to focus the collimated beam on the facet in the cross scan plane; however, two cylinder lenses may be used in a telephoto configuration which allows for a more compact pre-polygon optical path length. U.S. Pat. No. 4,941,721 illustrates the use of two cylindrical lenses between the beam collimator and the polygon in an overfilled system. According to the present invention, the two cylinder lenses of the prior art are replaced by two cylindrical mirrors so as to approximate a telephoto lens. The first cylindrical mirror must be tilted at a small angle in either the cross scan direction (sagittal plane) or the fast scan direction (tangential plane) in order to eliminate locational interferences between the elements and the beam of light. The second cylindrical mirror may also be tilted the same amount in the opposite direction to aim the beam incident on the polygon facet to be parallel to the plane of the polygon disk. This tilt angle should not be large because abberations may be greater at larger angles. The smaller the mirror, the smaller the angle can be. This design, as will be seen, results in a shortening of the pre-polygon mechanical path length enabling a more compact design which requires no additional elements. Although, technically this idea would work in either an underfilled or an overfilled ROS system, the greatest benefit would result from an overfilled system where the pre-polygon path length is usually much longer than in an underfilled system. More particularly, the present invention relates to a raster output scanner (ROS) imaging system comprising:

- a light source for generating a coherent collimated light beam output along an optical path,
- a photosensitive image plane,
- a rotatable multifaceted polygon interposed in the optical path between the light source and the photosensitive image plane for scanning light beams directed onto the facets of said polygon in a fast scan and slow scan direction across the photosensitive image plane,
- a post polygon optical system to focus reflected light beams from said polygon in said fast scan and slow scan directions, and
- a pre-polygon optical system including a first cylindrical mirror positioned in the optical path between said light source and said polygon, said first cylindrical mirror reflecting light onto a second cylindrical mirror, the second cylindrical mirror reflecting the beams to said polygon, said first and second cylindrical mirrors creating a focused beam in the cross scan axis of the polygon while maintaining the collimation of the beam in the perpendicular or scanning axis.

DESCRIPTION OF THE INVENTION

Figure 1:
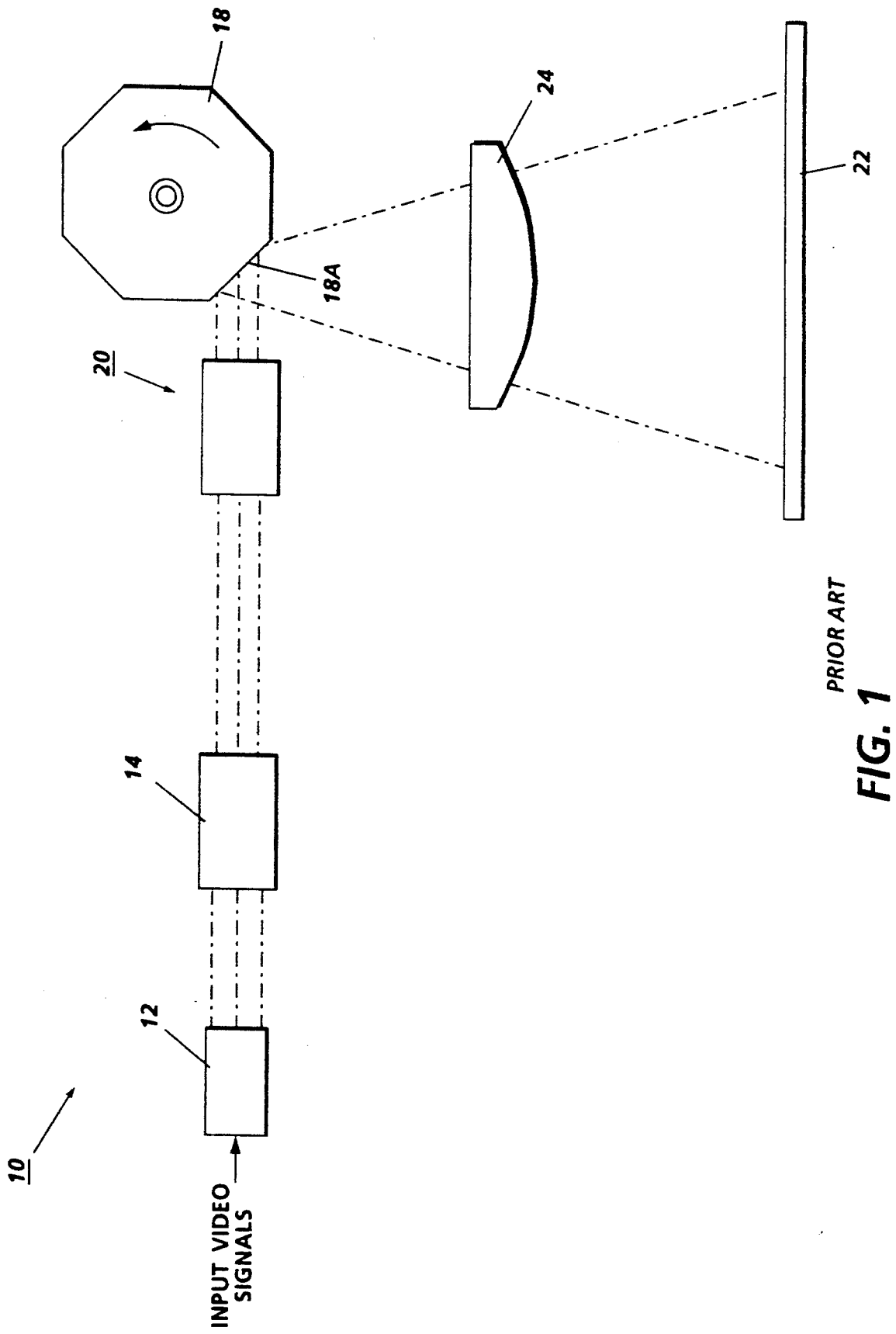
FIG. 1 is a top view in the tangential plane of a prior art ROS scanner.
Figure 2A:
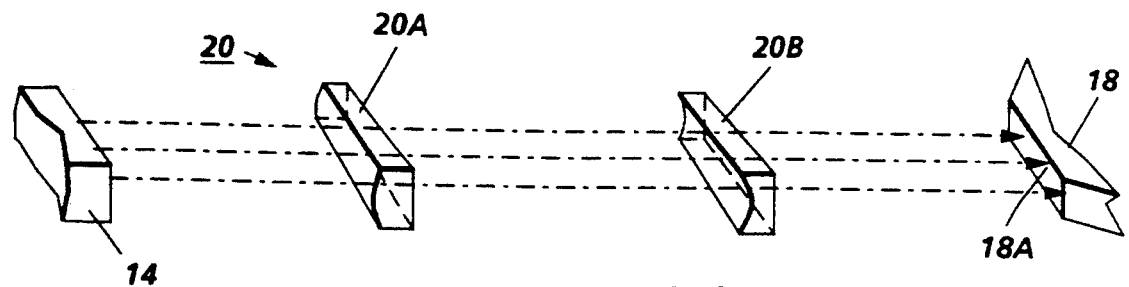
FIGS. 2A and 2B show a portion of the pre-polygon optics of FIG. 1 in a top perspective and in a side view, respectively.
Figure 2B:
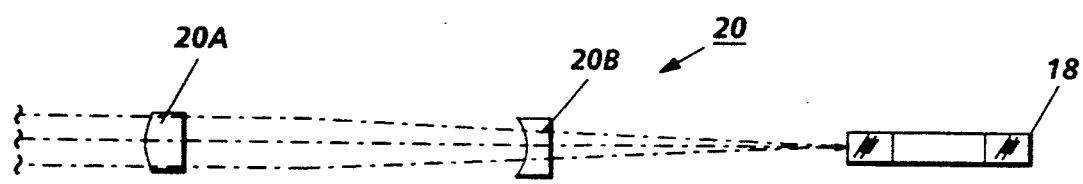

For purposes of illustration, FIG. 1 shows a prior art ROS type scanner 10 in which input video signals representing information to be printed are sent to a laser 12 which generates modulated output beams. Optical system 14 provides conventional collimation and beam expansion of the laser output. The collimated output from system 14 is focused onto facet 18A of rotating polygon 18, by cylindrical lens unit 20. Unit 20, shown in perspective view in FIG. 2A and side view in FIG. 2B comprises two cylindrical lenses 20A, 20B. The reflected rays from polygon 18 facets are focused in both the fast and slow scan directions at image plane 22 by FΘ lens 24. If the FΘ lens 24 does not contain a toroidal element then an additional cylinder mirror element may additionally be used to focus the reflected rays from polygon 18 facets in the slow scan direction (sagittal plane) at image plane. This element would also be the primary wobble correcting element.

Figure 3A:
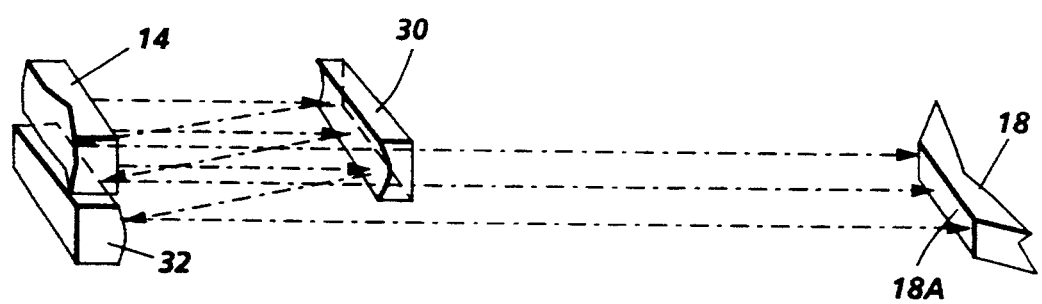
FIGS. 3A and 3B are perspective and side views respectively, of the pre-polygon optics shown in FIGS. 2A and 2B with the two cylindrical lenses replaced by two cylindrical mirrors according to the principles of the present invention.
Figure 3B:
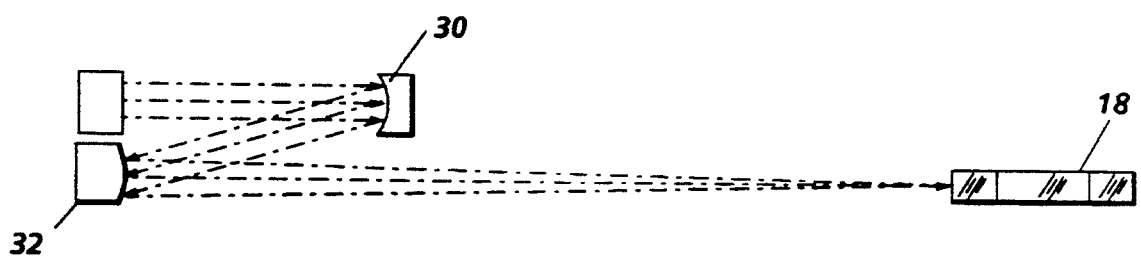

According to a first aspect of the invention and as shown in FIGS. 3A and 3B, lens 20A, 20B are replaced with two plastic, glass or metal cylindrical mirrors 30, 32. In one embodiment, mirror 30 is a negative mirror and mirror 32 is a positive mirror having design parameters shown in table 1.

TABLE #1

| Element | CYLINDER MIRRORS | | |
|---|---|---|---|
| | Radius mm | Spacing mm | Sagittal tilt degrees |
| Last surface of collimator 14 | N/A | 5.000 | — |
| Aperture Stop | infinity | 26.545 | — |
| Mirror 30 | −182.561 | 66.545 | 10.0 |
| Mirror 32 | +56.000 | 160.000 | −10.0 | pre-polygon sagittal magnification = −32.588
optical path length = (diode to facet) = 296.1 mm
mechanical path length = (diode to facet) = 165.0 mm The arrangement of these mirrors in the folding configuration shown produces an overfilled image at the surface of facet 18.

To illustrate the advantage of using the two mirror design, a comparison is made to a pre-polygon system whose cross-scan magnification requirement is −32.588; e.g. that given for the above two-mirror example in table 1. As shown in table 2 below, this magnification can be achieved with a diode laser, a collimator assembly and 2 cylinder lenses that have a telephoto configuration and the optical characteristics as shown. An alternative to this configuration is to replace the two cylinder lenses with two cylinder mirrors which meet the same pre-polygon magnification requirement of −32.588; e.g. the mirror pair having design data shown in table 1.

TABLE #2

| Element | CYLINDER LENSES | | |
|---|---|---|---|
| | Radius mm | Thickness or Spacing mm | Index |
| Last surface of collimator | N/A | 19.000 | — |
| Aperture Stop | infinity | 25.000 | — |
| Cylinder Lens 1 surface 1 | +66.797 | 6.000 | 1.510 |
| Cylinder Lens 1 surface 2 | infinity | 112.2 | air |
| Cylinder Lens 2 surface 1 | −9.195 | 3.000 | 1.510 |
| Cylinder Lens 2 surface 2 | infinity | 86.763 | air | pre-polygon sagittal magnification = −32.588
optical path length = (diode to facet) = 290.0 mm
mechanical path length = (diode to facet) = 290.0 mm Table 3 offers comparative data for the two systems. It is seen that each system has the same pre-polygon magnification and essentially the same focal length with either dual cylindrical lenses or with dual cylindrical mirrors. Note that although the optical path length (path over which the light travels) is slightly longer for the dual cylindrical mirror design than for the dual cylindrical lens design, the mechanical path length (overall length required for the assembly) decreases by 125 mm (approximately 5 inches). This is a substantial decrease in pre-polygon pathlength. For this example, the pre-polygon path length with the two cylinder mirrors is only 57% of the pre-polygon pathlength with the two cylinder lenses. It must be noted that although the mechanical length along the optical axis decreases, the mechanical height of the pre-polygon optics increases slightly due to the tilt angles required on the cylinder mirrors, but usually the height of the polygon motor drives the overall height of the ROS assembly. Therefore the mechanical path length of the mirror combination is shorter than that of the lens 20 configuration (FIG. 2A) of the prior art, thus reducing the total distance from the laser source to the polygon and enabling a more compact system design.

TABLE #3

| | CYLINDER LENSES & CYLINDER MIRRORS COMPARISON DATA | | |
|---|---|---|---|
| Case | Pre-polygon sagittal magnification | optical path length mm | mechanical path length mm |
| Cylinder Lenses | −32.588 | 290.0 | 290.0 |
| Cylinder Mirrors | −32.588 | 296.1 | 165.0 |

Optical path length reduction = 125 mm

Since the critical function of the pre-polygon cylinder lens is to shape the beam to the correct f-number at the facet in one axis only, the mirrors 30, 32 work as well as the lenses of the prior art. In addition, the cylindrical mirrors will eliminate the need for any pre-polygon fold mirror since a mirror pair will automatically reduce the total distance from the laser source to the facet.

Considerable benefit can also be derived from the fact that cylinder mirrors can be made less expensively than comparable quality cylinder lenses because of the material from which they are made. While lenses must be glass or transparent plastic, mirrors can be glass, less costly plastic or metal. Additionally, the replacement of the two cylinder lenses by two cylinder mirrors enables a more thermally stable optical system since the lenses are replaced by mirrors which are do not have the same heat, wavelength and index variation sensitivities that glass and plastic refractive optics do.

While the embodiment disclosed herein is preferred, it will be appreciated from this teaching that various alternative, modifications, variations or improvements therein may be made by those skilled in the art, which are intended to be encompassed by the following claims:

What is claimed is:

1. A raster output scanner (ROS) imaging system comprising:

a light source for generating a coherent collimated light beam output along an optical path, a photosensitive image plane, a rotatable multifaceted polygon interposed in the optical path between the light source and the photosensitive image plane for scanning light beams directed onto the facets of said polygon in a fast scan and slow scan direction across the photosensitive image plane, a post polygon optical system to focus reflected light beams from said polygon in said fast scan and slow scan directions, and a pre-polygon optical system including a first cylindrical mirror and a second cylindrical mirror positioned in the optical path between said light source and said polygon, said first cylindrical mirror reflecting, the light beams onto the second cylindrical mirror, the second cylindrical mirror reflecting the reflected light beams to said polygon, said first and second cylindrical mirrors creating a focused light beam in the cross scan axis of the polygon while maintaining the collimation of the focused light beam in the perpendicular or scanning axis.

2. The imaging system of claim 1 wherein said first cylindrical mirror is a negatively concave mirror and said second cylindrical mirror is a positive convex mirror.

3. The imaging system of claim 1 wherein the light beams directed against the rotating polygon completely illuminate each facet and a portion of adjacent facets.

4. The imaging system of claim 1 wherein rays reflected from the cylindrical mirrors propagate in a tangential plane at a tangent to the optical axis and in a sagittal plane at right angles to the tangential plane and wherein said cylindrical mirrors are tilted with respect to one of said planes.

5. A raster output scanner (ROS) imaging system utilizing an overfilled polygon facet design for forming images at a photosensitive medium comprising, means for providing a modulated beam of radiant energy, means for expanding and collimating the modulated beam, a polygon having at least one reflective facet positioned in the optical path of said modulated beam and adapted to scan a spot across said medium, a post polygon optical system to focus the modulated beam relected from said polygon, and a pre-polygon optical system including a first cylindrical mirror and a second cylindrical mirror positioned in the optical path between said light source and said polygon, said first cylindrical mirror reflecting the modulated beam onto a second cylindrical mirror, the second cylindrical mirror reflecting the reflected, modulated beam to said polygon, said first and second cylindrical mirrors creating a focused beam in the cross scan axis of the polygon while maintaining the collimation of the focused beam in the perpendicular or scanning axis.

* * * * *